United States Patent
Yamakawa

(10) Patent No.: US 8,468,322 B2
(45) Date of Patent: Jun. 18, 2013

(54) INFORMATION PROCESSING APPARATUS USING A PLURALITY OF FILE SYSTEMS

(75) Inventor: Junichi Yamakawa, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 12/810,503

(22) PCT Filed: Mar. 25, 2009

(86) PCT No.: PCT/JP2009/056764
§ 371 (c)(1),
(2), (4) Date: Jun. 24, 2010

(87) PCT Pub. No.: WO2009/123245
PCT Pub. Date: Oct. 8, 2009

(65) Prior Publication Data
US 2010/0284039 A1    Nov. 11, 2010

(30) Foreign Application Priority Data
Mar. 31, 2008    (JP) .................................. 2008-092223

(51) Int. Cl.
*G06F 12/00*    (2006.01)
(52) U.S. Cl.
USPC ........... 711/203; 711/114; 711/156; 711/170; 711/173
(58) Field of Classification Search
None
See application file for complete search history.

(56) References Cited

U.S. PATENT DOCUMENTS

2008/0183955 A1* 7/2008 Yang et al. .................... 711/103

FOREIGN PATENT DOCUMENTS

| JP | 7175592 A | 7/1995 |
| JP | 2001325128 A | 11/2001 |
| JP | 2005122439 A | 5/2005 |
| JP | 2008033451 A | 2/2008 |

OTHER PUBLICATIONS

International Preliminary Report on Patentability dated Oct. 5, 2010, issued in corresponding PCT Application No. PCT/JP2009/056764.
Written Opinion of the International Searching Authority dated Apr. 28, 2009, issued in corresponding PCT Application No. PCT/JP/2009/056764.

* cited by examiner

*Primary Examiner* — Shawn X Gu
(74) *Attorney, Agent, or Firm* — Fitzpatrick, Cella, Harper & Scinto

(57) ABSTRACT

In a copying apparatus, a storage capacity of an HDD which is used in a unique file system can be changed. In a partition area for image data formatted by a general-purpose file system, an area for a virtual unique high speed file system is provided and a reservation file having a data structure which can be used by the unique file system is constructed. A unique high speed file system accesses such an area, thereby enabling functions of the unique high speed file system to be virtually used and enabling information management of the image data to be made.

9 Claims, 10 Drawing Sheets

INFORMATION PROCESSING APPARATUS USING A PLURALITY OF FILE SYSTEMS

TECHNICAL FIELD

The invention relates to an information processing apparatus or the like for digitally forming and controlling, for example, image data by using a plurality of file systems.

BACKGROUND ART

In recent years, a multi-function apparatus obtained by adding a number of functions to a digital copying apparatus as a base has been put into practical use. Such a kind of multi-function apparatus has: a facsimile communicating function using a scanner and a printer which have inherently been equipped; a function for developing code data sent from a computer into bit map data and printing; a function for network-distributing an image read out by the scanner; and the like. The multi-function apparatus also has: a function for printing an image distributed from a network; what is called a personal box function; and the like. The personal box function is a function in which a storage area for an individual user or each division is assured and the printer images and scanner images are stored into the storage areas, so that those images can be output or the like at desired time.

In such a multi-function apparatus, since it is necessary to immediately process the image which has been read at high resolution, a unique file system peculiar to a device (in the description, such a system is referred to as a unique high speed file system) is used in order to process the image at a high speed. In such a unique high speed file system, in order to execute the high speed process of a file at the highest priority, for example, a size of one cluster is so large to be equal to 1 megabytes and control is made so as to store image data into a continuous area.

Functions which are provided in the case where the multi-function apparatus has been connected to the network are also being advanced. The image data can be used or shared between the different kinds of multi-function apparatuses or between a personal computer (PC) or a file server and the multi-function apparatus.

In recent years, a file system having advanced functions for efficiently making file management such as journaling or the like has becoming a general system. However, in the multi-function apparatus in the related art, as mentioned above, since file transfer performance is required, the unique high speed file system is used. There is such a problem that it is difficult to use the general file system having the advanced functions as it is.

In order to use or share the image data between the different kinds of multi-function apparatuses or between the PC or file server and the multi-function apparatus, since handling of a general-purpose file such as a PDF is necessary, it is indispensable to use a general-purpose file system of a new generation such as ext3.

In the multi-function apparatus in the related art, therefore, in the case of using or sharing the image data between the different kinds of multi-function apparatuses or the like, it is necessary to prepare two kinds of partitions of the unique high speed file system and the general-purpose file system.

FIG. 11 illustrates a construction of a hard disk in a multi-function apparatus in which the two kinds of partitions of the unique high speed file system and the general-purpose file system are prepared. In FIG. 11, a hard disk 1100 of 80 gigabytes, a partition 1101 having a size of 60 gigabytes of the general-purpose file system, and a partition 1102 having a size of 20 gigabytes of the unique high speed file system are illustrated.

However, in the case of using the construction in which the two kinds of partitions are previously prepared, it is difficult to change a partition size from viewpoints of a protection of user data and a maintenance in the market of the multi-function apparatus. There is, consequently, such a problem that the size which can be used cannot be changed every function according to a use object of the user.

DISCLOSURE OF INVENTION

The invention is made in consideration of the above circumstances and it is an object of the invention that in the case of using, for example, a unique high speed file system and a general-purpose file system, an area for each of the file systems is not preliminarily prepared but a size of an area for the unique high speed file system is enabled to be changed.

According to the invention, in the case of using a plurality of file systems, for example, a unique high speed file system and a general-purpose file system, an area for each of the file systems is not preliminarily prepared but a size of an area for the unique high speed file system is enabled to be changed.

According to the invention, there is provided an information processing apparatus using a plurality of file systems, comprising:

a storage device which is managed by a first file system;

a file forming unit configured to form one or a plurality of reservation files including a plurality of data blocks for assuring an area for a second file system in the storage device;

an area construction information forming unit for the second file system configured to form construction information of the area for the second file system;

a virtual logical block forming unit configured to form a virtual logical block address which is used by the second file system in order to designate data which is managed by the first file system in the storage device;

a logical block address converting unit configured to convert the virtual logical block address formed by the virtual logical block forming unit into a logical block address in the first file system based on the construction information formed by the area construction information forming unit for the second file system; and a data accessing unit configured to access the data block included in the reservation files based on the logical block address converted by the logical block address converting unit.

Other objects, constructions, and effects of the present invention will become apparent from the following detailed description and the accompanying drawings.

BEST MODE FOR CARRYING OUT THE INVENTION

An embodiment of the invention will be described hereinbelow.

<Network Construction>

Figure 1:
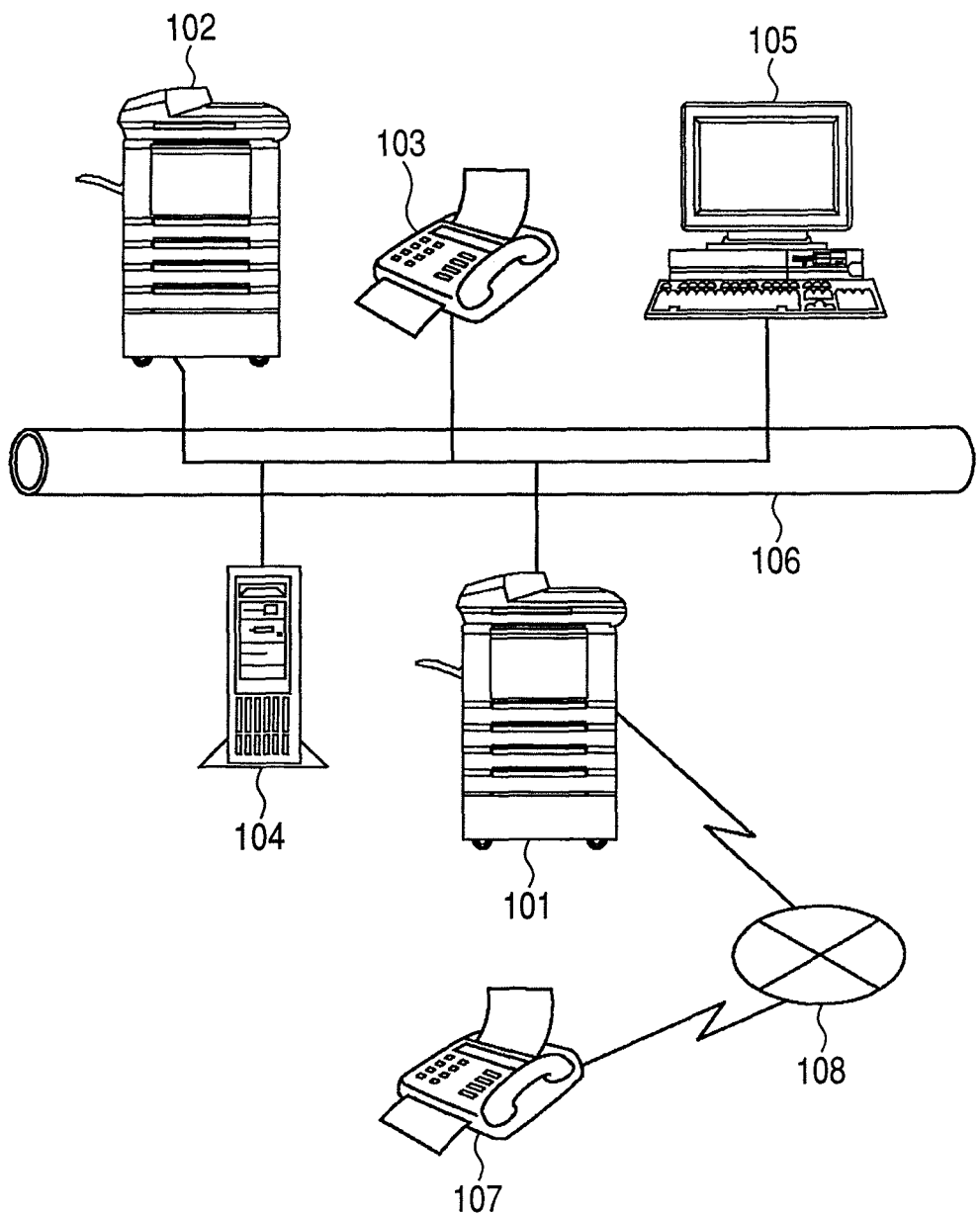
FIG. 1 is a diagram schematically illustrating a construction of a network system having a multi-function apparatus according to an embodiment of the invention.

FIG. 1 is a diagram schematically illustrating a construction of a network system having a multi-function apparatus according to the embodiment of the invention. In the embodiment, as a multi-function apparatus which functions as an information processing apparatus of the invention, a copying apparatus having a data transmitting function will be described as an example.

In FIG. 1, a copying apparatus 101 is connected to a copying apparatus 102 having functions similar to those of the copying apparatus 101, a facsimile 103, a database/mail server 104, and a client computer 105 through a LAN 106 constructed by Ethernet (registered trademark) or the like. The copying apparatus 101 is also connected to a facsimile 107 through a public line (WAN) 108. By connecting those apparatuses, the network system according to the embodiment of the invention is constructed.

The copying apparatus 101 has not only a copying function and a facsimile function but also the data transmitting function for reading an image of an original document and transmitting the read image data to each apparatus on the LAN 106. The copying apparatus 101 also has a PDL (page description language) function and can receive and print a PDL image instructed from the computer connected onto the LAN 106. The copying apparatus 101 also has a function for storing an image read by the copying apparatus 101 and the PDL image instructed from the computer connected onto the LAN 106 into a designated box area in an HDD 204 and can print the images stored in the box area. The above function is what is called a personal box function.

The copying apparatus 101 also has a function for receiving data read by the copying apparatus 102 through the LAN 106, storing the received data into the HDD 204 (refer to FIG. 2) in the copying apparatus 101, and printing and outputting. The copying apparatus 101 further has a function for receiving an image of the database/mail server 104 through the client computer 105 and the LAN 106, storing the received data into the copying apparatus 101, and printing and outputting.

The facsimile 103 can receive the data read by the copying apparatus 101 through the LAN 106 and transmit the received data. The database/mail server 104 is a server apparatus having a function for receiving the data read by the copying apparatus 101 through the LAN 106, storing the received data into an internal database, and transmitting as E-mail.

The client computer 105 can obtain desired data from the database/mail server 104 and display it. The client computer 105 also can receive the data read by the copying apparatus 101 through the LAN 106 and modify and edit the received data. The facsimile 107 can receive the data read by the copying apparatus 101 through the public line 108 and print and output the received data.

<System Construction of Copying Apparatus 101>

Figure 2:
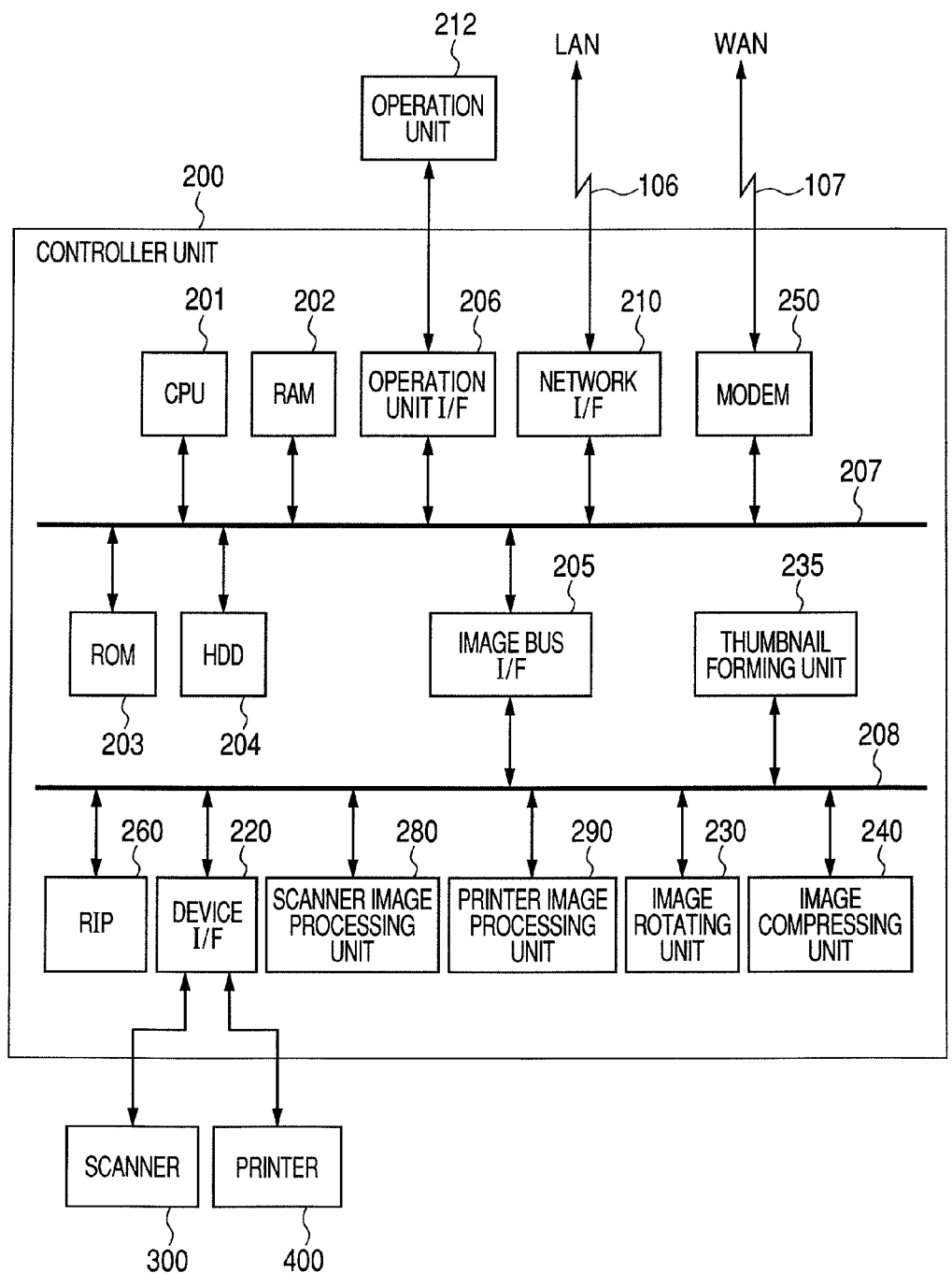
FIG. 2 is a block diagram illustrating a system construction of a main section of a copying apparatus according to the embodiment of the invention.

FIG. 2 is a block diagram illustrating a system construction of a main section of the copying apparatus 101 according to the embodiment of the invention.

In FIG. 2, a controller unit 200 makes various kinds of control in the copying apparatus 101. For example, a scanner 300 as an image input device and a printer 400 as an image output device are connected to the controller unit 200. The controller unit 200 makes control to realize a copying function for allowing the printer 400 to print and output the image data read by the scanner 300. The controller unit 200 is also connected to the LAN 106 or the public line (WAN) 108, thereby making control to input and output image information or device information.

Processes by the controller unit 200 are executed mainly by a CPU 201. The CPU 201 activates an operation system (OS) by a boot program stored in a ROM 203 and executes an application program stored in the hard disk drive (HDD) 204 on the OS, thereby making various kinds of control. A RAM 202 can be used as a work area of the CPU 201. The RAM 202 is used as a work area and provides an image memory area for temporarily storing the image data. The HDD 204 also stores the image data together with the application program.

Besides the RAM 202, ROM 203, and the like, an operation unit interface (operation unit I/F) 206, a network interface (network I/F) 210, and the like are connected to the CPU 201 through a system bus 207. A modem 250, an image bus interface (image bus I/F) 205, and the like are also connected.

The operation unit I/F 206 is an interface with an operation unit 212 having a touch panel and outputs the image data to be displayed to the operation unit 212 to the operation unit 212. The operation unit I/F 206 also transmits information input by the user in the operation unit 212 to the CPU 201.

The network I/F 210 inputs and outputs information to/from the various apparatuses on the network through the LAN 106. A modem 250 is connected to the public line 108 and inputs and outputs the information through the public line 108.

The image bus I/F 205 is also a bus bridge for connecting the system bus 207 and an image bus 208 for transferring the image data at a high speed and converting a data structure of the data which is transmitted and received between them. The image bus 208 is constructed by a PCI bus, an IEEE 1394, or the like.

A raster image processor (RIP) 260, a device I/F 220, a scanner image processing unit 280, a printer image processing unit 290, an image rotating unit 230, a thumbnail forming unit 235, and an image compressing unit 240 are connected to the image bus 208.

The RIP 260 is a processor for developing the PDL code into a bit map image. The scanner 300 and the printer 400 are connected to the device I/F 220 and the device I/F 220 executes a conversion of a synchronous system/asynchronous system of the image data. The scanner image processing unit 280 executes a correction, a modification, and an edition to the input image data. The printer image processing unit 290 executes a correction of a printer, a resolution conversion, and the like for the print output image data. The image rotating unit 230 executes a process for rotating the image data. The thumbnail forming unit 235 forms the image data for an index display or the like. The image compressing unit 240 compresses the multivalue image data to JPEG data or the like, compresses the binary image data to data of JBIG, MMR, MH, or the like, and also executes a decompressing process of those data.

<Hardware Construction of Copying Apparatus 101>

Figure 3:
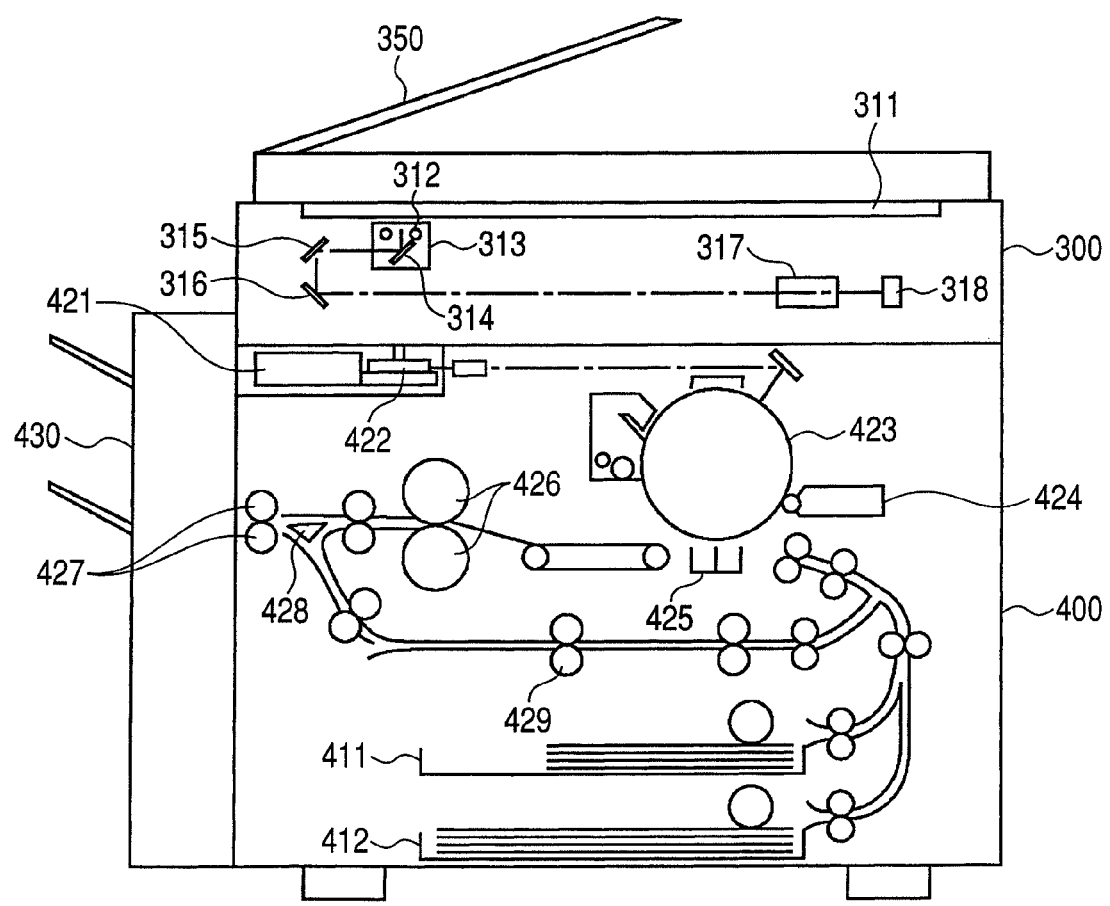
FIG. 3 is a diagram schematically illustrating a hardware construction of a scanner and a printer of the copying apparatus according to the embodiment of the invention.

FIG. 3 is a diagram schematically illustrating a hardware construction of the scanner 300 and the printer 400 of the copying apparatus 101 in FIG. 1. In the copying apparatus 101, the scanner 300 and the printer 400 are integratedly constructed as illustrated in FIG. 3.

An original feeding unit 350 is mounted onto the scanner 300. The scanner 300 sequentially feeds an original document one by one onto platen glass 311 from the top from the original feeding unit 350. Each time the reading operation of each original is finished, the scanner 300 ejects the original onto an ejecting tray (not shown) from the platen glass 311.

When the original is fed onto the platen glass 311, the scanner 300 turns on a lamp 312 and starts a movement of a moving unit 313. By the movement of the moving unit 313, the original on the platen glass 311 is read and scanned. During the reading scan, reflection light from the original passes through mirrors 314, 315, and 316 and a lens 317 and is guided to a CCD image sensor (hereinbelow, CCD) 318, and an image on the original is formed onto an image pickup surface of the CCD 318. The CCD 318 converts the image formed on the image pickup surface into an electric signal. The electric signal is subjected to predetermined processes and, thereafter, input to the controller unit 200.

The printer 400 has a laser driver 421 and drives a laser emitting unit 422 by using the laser driver based on the image data input from the controller unit 200. Thus, a laser beam according to the image data is emitted from the laser emitting unit 422. The laser beam is irradiated onto a photosensitive drum 423 while being scanned. An electrostatic latent image is formed onto the photosensitive drum 423 by the irradiated laser beam. The electrostatic latent image is visualized as a toner image by toner supplied from a developing unit 424.

Recording paper is fed between the photosensitive drum 423 and a transfer unit 425 through a conveying path from one of cassettes 411 and 412 synchronously with irradiation timing of the laser beam. The toner image on the photosensitive drum 423 is transferred onto the recording paper fed by the transfer unit 425.

The recording paper onto which the toner image has been transferred is sent to a fixing roller pair (a heating roller and a pressure roller) 426 through a conveying belt. The fixing roller pair 426 presses the recording paper with heat, thereby fixing the toner image on the recording paper onto the recording paper. The recording paper which passed through the fixing roller pair 426 is discharged onto a discharge unit 430 by a discharge roller pair 427.

The discharge unit 430 is constructed by a sheet processing apparatus which can execute a post-process such as sorting, stapling, or the like. If a duplex recording mode has been set, after the recording paper was conveyed to the discharge roller pair 427, the rotating direction of the discharge roller pair 427 is reversed, thereby guiding the recording paper to a re-feed conveying path 429 by a flapper 428. The recording paper guided to the re-feed conveying path 429 is fed again between the photosensitive drum 423 and the transfer unit 425 at the foregoing timing. The toner image is transferred onto the reverse surface of the recording paper.

<Example of Data Structure of Unique High Speed File System>

Figure 4:
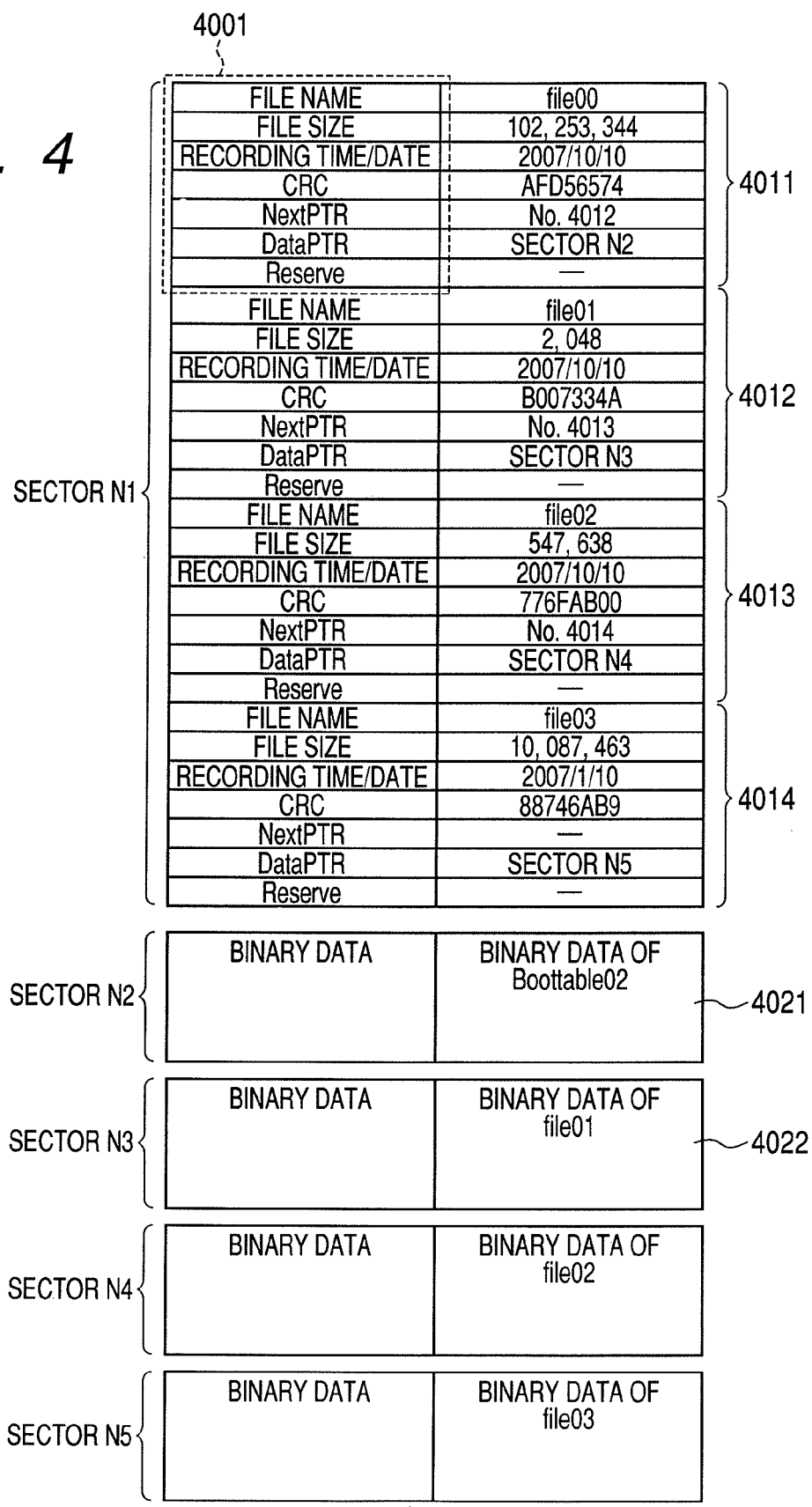
FIG. 4 is a diagram illustrating an example of a data structure of a unique high speed file system which is used by the copying apparatus according to the embodiment of the invention.

FIG. 4 is a diagram illustrating an example of a data structure of the unique high speed file system which is used by the copying apparatus 101 according to the embodiment.

The general-purpose file system can always efficiently store the data into a storage device such as hard disk or memory which can be accessed at random and can permanently manage the data without destroying them with respect to an addition/deletion of almost all files so long as there is an empty capacity in the storage. According to the unique high speed file system, which will be described hereinbelow, by limitedly utilizing advantages of the general-purpose file system, a simple file system which stores a file by a continuous sector is constructed by itself, thereby guaranteeing a high speed access.

In FIG. 4, a structure of a cache file (file information header) 4001 formed on a partition is illustrated. In the embodiment, the file information header 4001 has elements such as file name, file size, recording time/date, CRC, NextPTR, DataPTR, and Reserve.

The file information header 4001 is stored as a layout into file management areas 4011 to 4014. In the embodiment, the four file management areas are provided in a sector N1 in the storage device such as an HDD and the four file information headers 4001 can be managed. In each of the file management areas 4011 to 4014, a position of a next file information header can be referred to by a pointer shown by "NextPTR" in the stored file information header 4001.

In the embodiment, the number 4012 is referred to from "NextPTR" in the file information header stored in the file management area 4011. The number 4013 is referred to from "NextPTR" in the file information header stored in the file management area 4012. The number 4014 is referred to from "NextPTR" in the file information header stored in the file management area 4013. There is no reference destination in "NextPTR" in the file information header stored in the file management area 4014 and no file information headers are subsequently referred to. It is now assumed that the foregoing numbers 4012 to 4014 denote positions of the file management areas 4012 to 4014 on the sector N1.

In the unique high speed file system which is used in the embodiment as mentioned above, the pointer of the next file information header is indicated from the present file information header. Even if the file information headers were dispersed, it is possible to access all file information.

Storage destinations of real data (binary data) of the files corresponding to the file information headers are sectors N2 to N5 in the storage device as will be referred to in the diagram. In each file information header, the storage destination of the corresponding binary data is managed by "DataPTR" possessed by itself. In the embodiment, for example, "DataPTR" of the file information header stored in the file management area 4011 is the sector N2 and it is possible to specify that the corresponding data is "binary data of Boottable02" shown in 4021. "DataPTR" of the file information header stored in the file management area 4012 is the sector N3 and it is possible to specify that the corresponding data is "binary data of file01" shown in 4022.

In the construction as mentioned above, for example, like ReadCacheFile("file02",load_ptr), it is assumed that the program has executed a command for loading the file of "file02" into an address shown by "load_ptr" at a high speed. In this case, the unique high speed file system makes control according to the following flow (1) to (8).

(1) The sector N1 as a head of the file information header is loaded into the memory.

(2) In the file management area 4011 on the sector N1, file names "file00" and "file02" are compared and "mismatch" is determined.

(3) In the file management area 4011, "NextPTR" is referred to and "IndexRegister" is changed into the file management area 4012.

(4) In the file management area 4012, file names "file01" and "file02" are compared and "mismatch" is determined.

(5) In the file management area 4012, "NextPTR" is referred to and "IndexRegister" is changed into the file management area 4013.

(6) In the file management area 4013, file names "file02" and "file02" are compared and "match" is determined.

(7) In the file management area 4013, "DataPTR" is referred to and the sector N4 is determined as a data storing location.

(8) An instruction is made to a driver to load data as much as a file size of the file management area 4013 into Load_ptr from the sector N4.

By realizing the above algorithm, the data can be loaded at a high speed. The same control can be also made with respect to the storage of the file. However, since such a file system has a construction in which when the data having the same file name and a different size is overwritten, the storage by the continuous sector cannot be performed, a mechanism for guaranteeing it is necessary.

For example, in the case where the file having the same file name has been updated and the size is larger than that of the present file, there is a case where the storage areas cannot be continuously assured. In such a case, the area for storing one file, for example, the number of plural sectors existing between the sectors N2 and N3 and the number of plural sectors existing between the sectors N3 and N4 are set to the maximum size which each file can have. If a using application is limited in this manner, the unique high speed file system can be constructed in the copying apparatus 101. The copying apparatus 101 according to the embodiment can access the image data at a high speed by using the file management mechanism of such a unique high speed file system.

<General-Purpose File System>

Subsequently, the general-purpose file system which is used by the copying apparatus 101 according to the embodiment will be described. The unique high speed file system as mentioned above is not suitable for the file management or backup because importance is attached to a high file accessing speed. To compensate such a problem, therefore, the copying apparatus 101 uses ext3 (Third Extended Filesystem) of Linux as an advanced function general-purpose file system. However, according to the construction having only such a general-purpose file system, the copying apparatus 101 cannot guarantee the high speed access to the image data. According to the construction using two kinds of file systems by providing two partitions, a size of partition which is used cannot be changed every function according to the using application of the user. In the embodiment, therefore, while the partitions of the unique high speed file system are not formed in the HDD 204, the unique high speed file system and the general-purpose file system are enabled to be used. A construction in such a case will be described in detail hereinbelow. Although ext3 of Linux has been mentioned as an example of the general-purpose file system in the embodiment, another general-purpose file system may be used.

<Area for Unique High Speed File System>

Figure 5A:
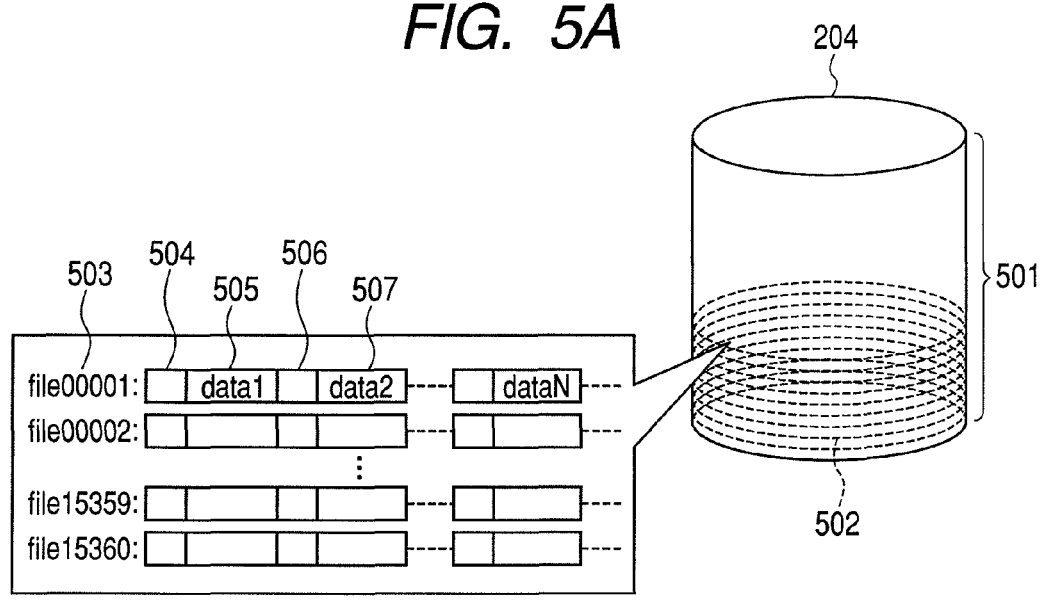
FIGS. 5A and 5B are diagrams illustrating a construction in an HDD when the copying apparatus according to the embodiment of the invention has formed an area for the unique high speed file system.

FIG. 5A is a diagram illustrating a construction in the HDD 204 for forming the area for the unique high speed file system. In the HDD 204, the whole hard disk is formatted by ext3 and is constructed by a plurality of partitions. A partition area 501 for the image data among those partitions is illustrated. An area 502 of a reservation file for a virtual unique high speed file system is assured so as to become a continuous area in the HDD 204. The reservation file having a size of a fixed length has been stored in such an area.

A reservation file name 503 as a name of the reservation file is illustrated. A portion 504 other than the data block in the first block group of the reservation file is illustrated. In this portion, a super block, a group descriptor, a data block bit map, an i-node bit map, and an i-node table are included. A data block 505 in the first block group of the reservation file is illustrated. A portion 506 other than the data block in the second block group of the reservation file is illustrated. A data block 507 in the second block group is illustrated. The reservation file is constructed so as to include a plurality of data blocks as mentioned above.

Figure 5B:
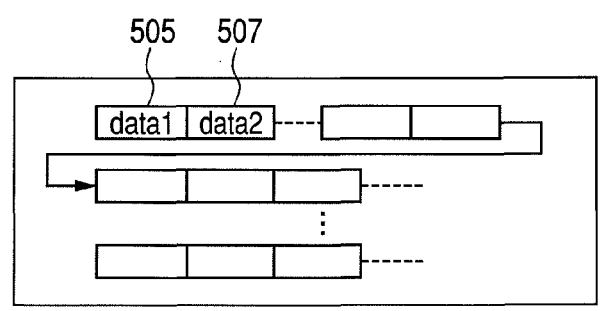

FIG. 5B is a diagram schematically illustrating that the area of the unique high speed file system is formed by sequentially tracing the data blocks of the reservation file for the virtual unique high speed file system starting from the beginning of the reservation file name 503.

<Flow for Constructing Unique High Speed File System>

Figure 6:
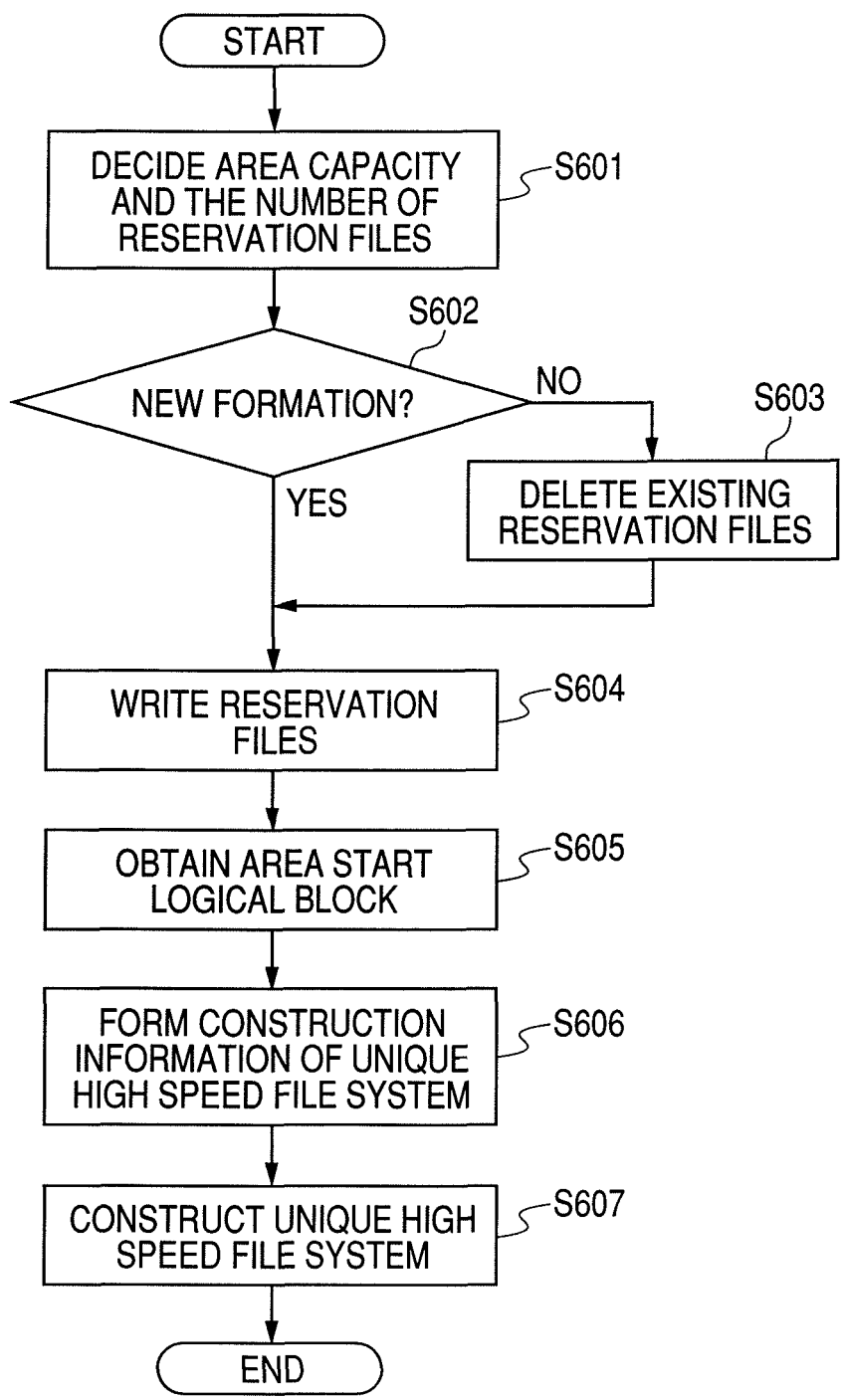
FIG. 6 is a flowchart illustrating a flow when the copying apparatus according to the embodiment of the invention constructs the unique high speed file system.

Subsequently, a flow for constructing the unique high speed file system according to the embodiment will be described by using a flowchart illustrated in FIG. 6.

First, in step S601, by which amount a hard disk capacity is allocated to the personal box function using the unique high speed file system in the copying apparatus 101 is decided and the number of reservation files for assuring the area of the unique high speed file system is obtained.

As a method of obtaining the number of reservation files, first, a size of reservation file for the area of the unique high speed file system is set as a size of one cluster as a size of one block of the unique high speed file system. The capacity for the personal box function in the unique high speed file system is divided by the reservation file size obtained as mentioned above, thereby obtaining the number of reservation files.

For example, in ext3, it is assumed that one data block is constructed by 4 kbytes and the partition area 501 for the image data is constructed by 40 Gbytes. It is assumed that a size of one block in the unique high speed file system is equal to 1 Mbytes and the user wants to use about 15 Gbytes as a capacity for the personal box function. In this case, the number of reservation files is obtained as follows.

That is, in order to set the size of one reservation file to the size of one block in the unique high speed file system, "15 Gbytes/1 Mbytes=15360" and 15360 reservation files are formed. The number of reservation files is increased or decreased according to the capacity for the personal box function, that is, the number of data which is managed by the personal box function and the capacity.

Subsequently, in step S602, it is discriminated whether a reservation file is to be newly formed like a case just after the system is installed or the reservation file has already been formed. In the case of the new formation, step S604 follows. If the reservation file has already existed, step S603 follows. The discrimination about the new formation of the reservation file is made by checking whether or not an area logical block address, which will be described hereinafter, has already been set.

In step S603, the existing reservation files are deleted and the hard disk is optimized. The optimization is performed in order to enable the continuous areas to be assured as much as possible by combining the segmented blocks. After the process of step S603, step S604 follows.

In step S604, the reservation files of the number necessary for the personal box function which uses the unique high speed file system in the partition area 501 for the image data in the HDD 204 are written. In the foregoing example, 15360 empty reservation files of 1 Mbytes are formed and written. The processes of steps S601 to S604 correspond to one processing example of a file forming unit in the invention. The general-purpose file system corresponds to the first file system and the unique high speed file system corresponds to the second file system here.

Subsequently, in step S605, a logical block address of the area for the unique high speed file system (address of an area start logical block) is obtained. An i-node of head file00001 in the reservation files and addresses in a range from the head block in the partition area 501 for the image data to the area start logical block of the unique high speed file system are obtained.

Subsequently, in step S606, the data blocks of the 15360 reservation files formed in step S604 are analyzed and unique high speed file system construction information is formed. The process of step S606 corresponds to one processing example of a unit for forming the area construction information for the second file system in the invention.

Figure 7:
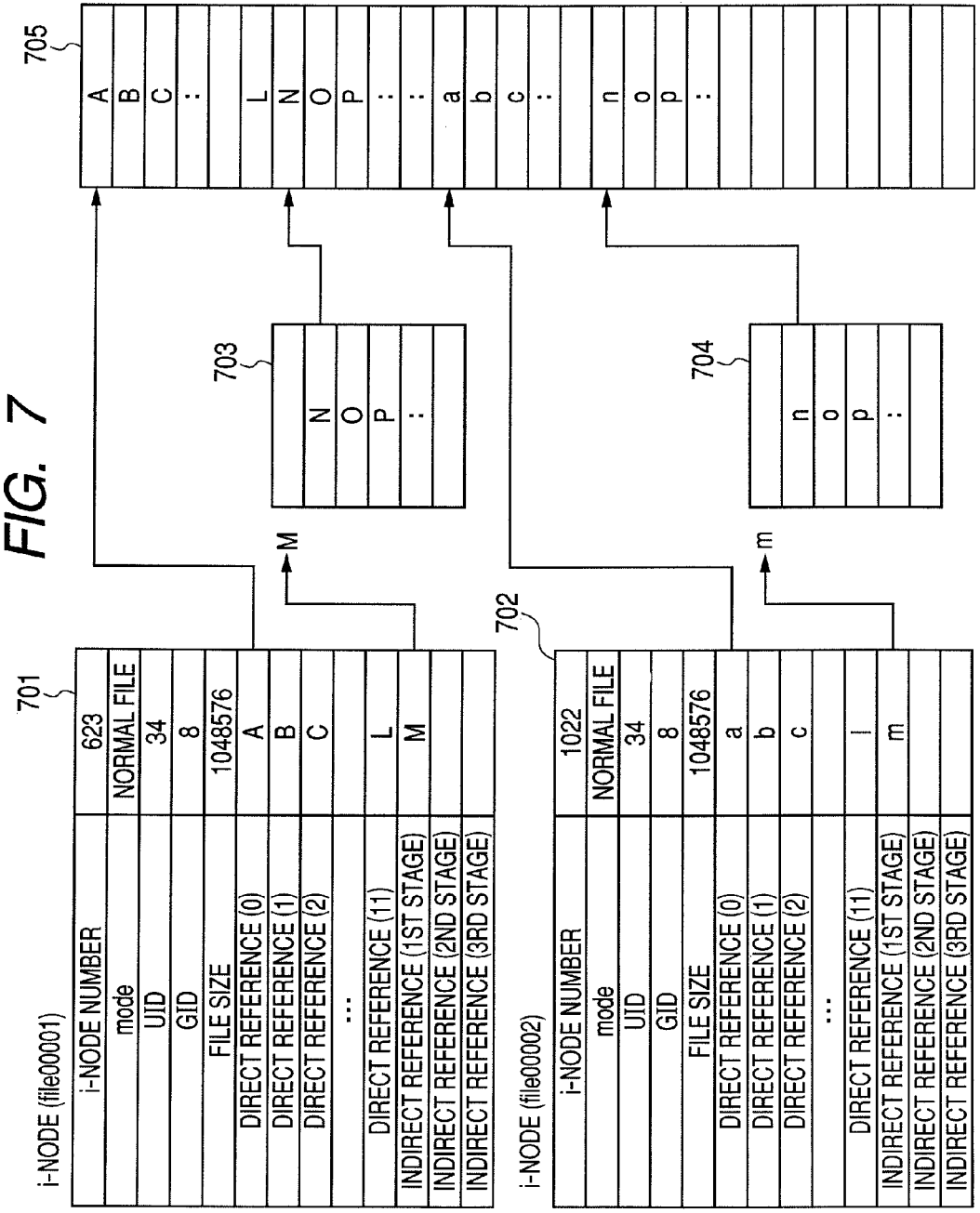
FIG. 7 is a diagram for describing unique high speed file system construction information which is formed by the copying apparatus according to the embodiment of the invention.

The unique high speed file system construction information which is formed in step S606 will now be described. As illustrated in FIG. 7, the unique high speed file system construction information is a table of logical block addresses (LBAs) in the HDD 204. The table is formed by i-node information of file00001 to file15360.

In FIG. 7, an i-node of file00001 is shown at 701 and an i-node of file00002 is shown at 702. An i-node of the indirect reference first stage which is referred to by an address M is shown at 703. An i-node of the indirect reference first stage which is referred to by an address m is shown at 704. A table 705 shows the unique high speed file system construction information (hereinbelow, such a table is referred to as a unique high speed file system construction table).

The i-node has: an i-node number; a mode (mode) in which a type of file such as normal file, directory, or the like; a user ID (UID); a group ID (GID); and a file size. The i-node further has: a direct reference address to the data block; and indirect reference addresses to the data blocks of the first to third stages. Since all of the reservation files have the size of 1 Mbytes, there is only the first stage of indirect reference. Addresses file00001 to file15360 which directly refer to the data blocks are set in order into the unique high speed file system construction table 705.

Returning to FIG. 6, after the unique high speed file system construction table was formed in step S606, the unique high speed file system is constructed in step S607. In other words, based on the unique high speed file system construction table 705, the unique high speed file system is set into a state where the data can be managed by using the areas of the reservation files in the HDD 204. Since the block size of the ext3 file system is equal to 4 kbytes, the unique high speed file system described by using FIG. 4 is constructed into the areas of every 4 kbytes from the address in the unique high speed file system construction table 705.

As described above, in the copying apparatus 101, in the partition areas for the image data formatted by ext3, the areas of the reservation files for the virtual unique high speed file system are provided and the information of the i-node is used, thereby constructing the unique high speed file system. Thus, the advanced function general-purpose file system is used and the unique high speed file system can be used without forming the partition of the unique high speed file system. A specific using form of such a file system will be described hereinbelow.

<Access to Unique High Speed File System Area>

Figure 8:
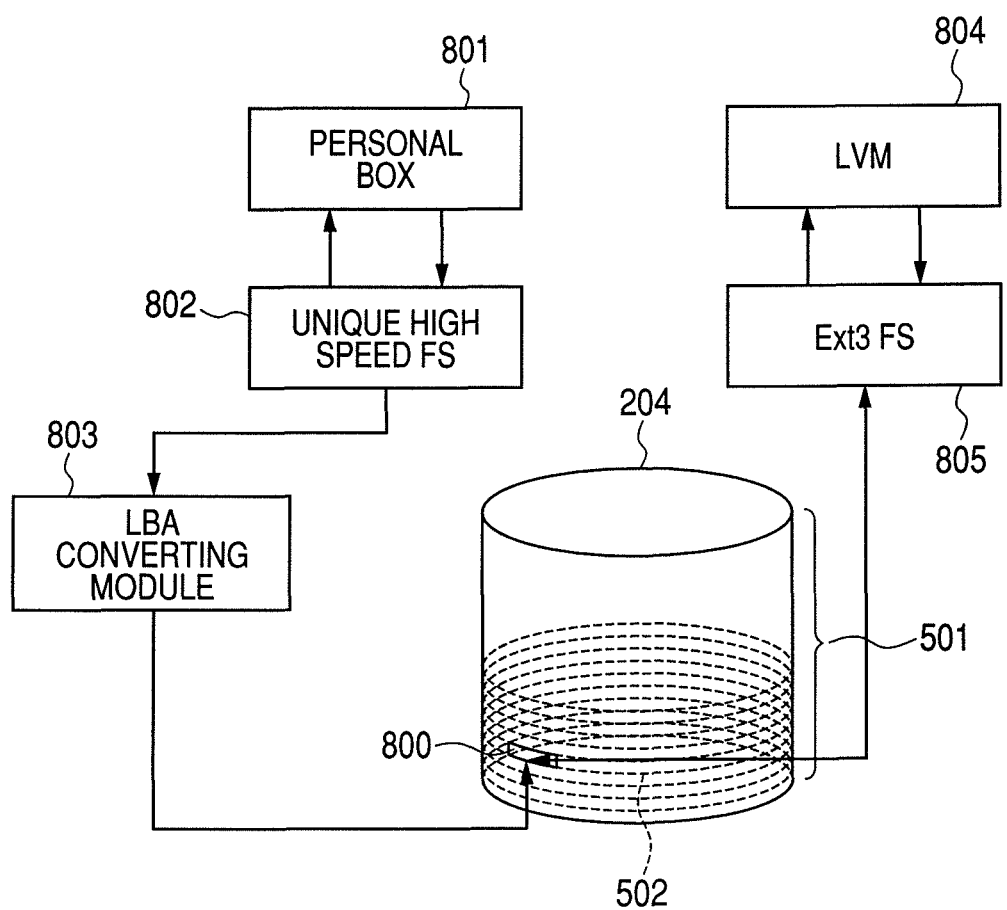
FIG. 8 is a diagram for describing a state when the unique high speed file system and an advanced function general-purpose file system access the same logical block in the HDD in the embodiment of the invention.

FIG. 8 is a diagram for describing a state when the two systems of the foregoing unique high speed file system and ext3 as a general-purpose file system access the same logical block in the HDD 204. In FIG. 8, a logical block is shown at 800. An application 801 of the personal box function is provided. A unique high speed file system 802 is provided. A logical block address (Logical Block Address) converting module (hereinbelow, referred to as an LBA converting module) 803 is provided. An LVM (Logical Volume Manager) 804 is a function on the OS for managing the disk area and is used for expansion and backup of the disk. An ext3 file system 805 is provided.

The registering operation of a PDL job into the personal box area will now be described as an example of processes using the unique high speed file system in the embodiment.

Figure 9:
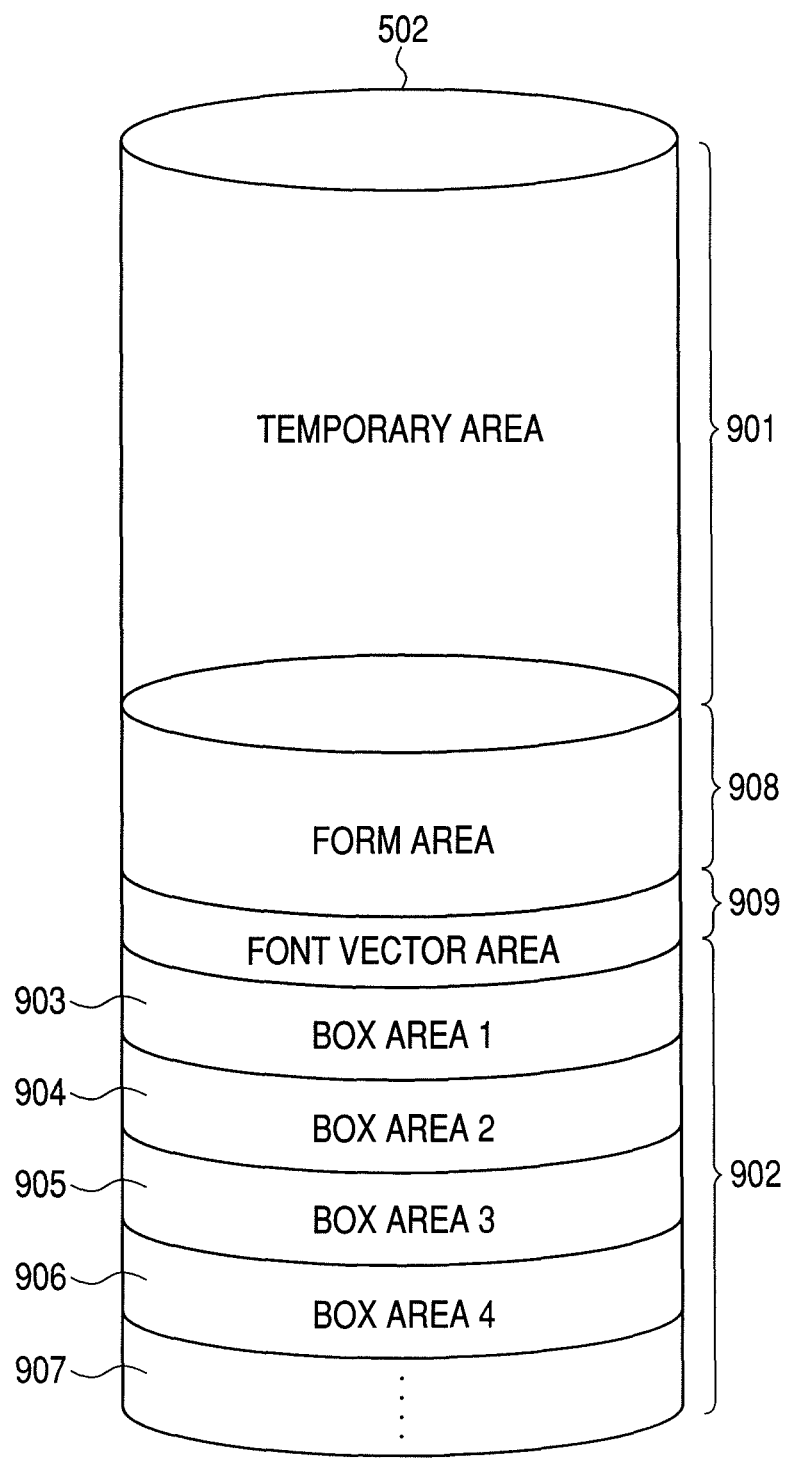
FIG. 9 is a diagram illustrating a logical using method of the unique high speed file system area in the embodiment of the invention.

FIG. 9 is a diagram illustrating a logical using method of the unique high speed file system area 502. As illustrated in FIG. 9, the storage area in the HDD 204 is logically divided into a temporary area 901 and a box area 902 here according to the using application.

The temporary area 901 is a storage area for temporarily storing development data of the PDL or the image data from the scanner in order to change output order of the image data or to enable a plurality of output data to be output by one scan. The box area 902 is a storage area for using the personal box function and includes box areas 903 to 907 as small storage areas of the number registered in the personal box function. The box areas 903 to 907 can be allocated to each user or each division in a company or the like. A box name and a password can be allocated to each box. The user can input a PDL job or a scan job into each box by designating the box. The user can actually see the inside of the box or can change the settings or print and output by inputting the password. A form area 908 and a font vector area 909 are provided.

Figure 10:
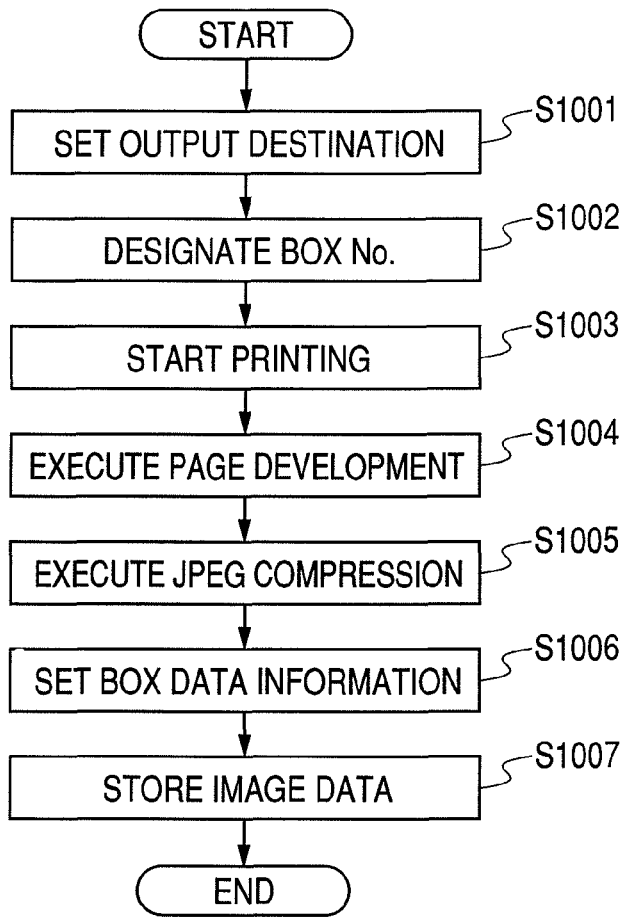
FIG. 10 is a flowchart for describing a flow for the registering operation of a PDL job which is executed by the copying apparatus according to the embodiment of the invention into a personal box.
Figure 11:
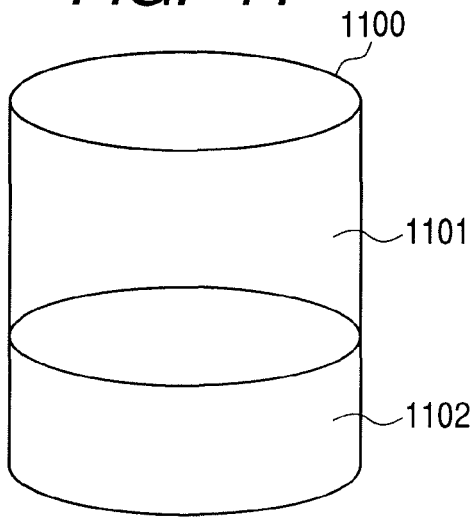
FIG. 11 is a diagram illustrating a construction of a hard disk when a copying apparatus in the related art uses the unique high speed file system and the advanced function general-purpose file system.

FIG. 10 is a flowchart for describing a flow for the registering operation of the PDL job into the personal box, in which the operation is executed by the copying apparatus 101.

First, in step S1001, an output destination is set into "personal box" by the print settings of a printer driver (not shown).

Subsequently, in step S1002, the box number which the user wants to register is designated. Subsequently, in step S1003, the registering operation is started by pressing a print start button of the printer driver.

In step S1004, the PDL job data is analyzed by a rendering engine, developed into bit map data which can be printed (page development), and written into an image memory. In step S1005, the a JPEG compression is performed.

In step S1006, an information setting of the box data is performed. A print job name, latest updating time of the page, a printing time, a sheet size, the number of pages, and the like are set. In step S1007, the compressed image data is stored into any designated one of the box areas 903 to 907. The processes described in FIG. 10 correspond to one processing example of a data accessing unit in the invention.

When the personal box 801 accesses the HDD 204, the personal box 801 accesses through the unique high speed file system 802. In detail, the unique high speed file system 802 designates the virtual logical block address which is used for data management. This virtual logical block address is converted into the logical block address of the HDD 204 and a reading/writing position in the HDD 204 is designated. In other words, it is designated by the logical block address from the head position of the unique high speed file system partition having a size of 15 Gbytes. At this time, the virtual logical block address is input into the LBA converting module 803 and converted into the logical block address of the area of the ext3 file system. The virtual logical block address which is used by the unique high speed file system 802 has preliminarily been formed by the function which the file system has (this function corresponds to a virtual logical block forming unit).

The LBA converting module 803 arithmetically operates the logical block address for accessing the HDD 204 from the unique high speed file system construction table 705. For example, the virtual logical block address which is designated by the unique high speed file system 802 is assumed to be LBA1. In this case, a logical block address LBA2 which is actually read out/written of the HDD 204 can be obtained by adding, as an offset, the start logical block address of the reservation file area obtained in step S605 to LBA1. The LBA converting module 803 corresponds to one construction example of a logical block address converting unit in the invention.

<Backup Using LVM>

Subsequently, a backup using the LVM 804 will be described. The LVM 804 is a function for managing the disk area. The LVM 804 cannot be used in the unique high speed file system but can be used in the advanced function file system such as ext3. Specifically speaking, the LVM 804 can divide the disk area into several areas and can handle the divided disk areas as one disk area. According to the partition management, the divided disk areas cannot be handled as one disk area. However, in the LVM 804, the disk areas which are physically different can be handled as one area. Therefore, a logical area which can be used can be easily increased by expanding a hard disk and collecting the disk area together with the existing disk area into one area.

The LVM 804 has a function called "snap shot" for forming a copy of the logical area at a certain moment and can perform the backup by using this function. Since the snap shot does not actually copy the data in the logical area, the data can be backed up in a short time. The LVM 804 has an allocation management table in which a correspondence relation between the physical area and the logical area has been written. Just after the snap shot of the logical area of a certain disk was formed, the logical area and the snap shot indicate the same location in the allocation management table. That is, the data exists only at one location. When the writing occurs in the logical area after the snap shot was formed, the area where the rewriting occurred is retracted to a snap shot area and the data retracted through an exceptional table is read out of the snap shot, so that the snap shot data itself is not changed. Thus, the backup of a short down-time can be performed.

As mentioned above, in the embodiment, in the partition area for the image data which has been formatted by ext3, the area for the virtual unique high speed file system is provided and the reservation file having a data structure which can be used by the unique file system is constructed in this area. The unique high speed file system accesses such an area, thereby enabling the functions of the unique high speed file system to be virtually used and enabling the information management of the image data to be made. The number of reservation files can be varied based on a predetermined capacity according to the functions of the unique high speed file system and based on the number of data.

By using such a construction, the unique high speed file system and the general-purpose file system can be used in common without providing the partition. The allocation of the capacity in the HDD 204 for the high speed unique file system can be changed according to the personal box function which manages the data by using the function which is used by the user, specifically speaking, by using the high speed unique file system.

Since the general-purpose file system is used, the image data can be used or shared between the different types of multi-function apparatuses or between the PC or file server and the multi-function apparatus. As mentioned above, in the case of using or sharing the image data, that is, in the case of using the personal box function or the like, while almost maintaining the high speed processing performance by the unique high speed file system, the managing function of the general-purpose file system such as differential backup or the like can be used In order to realize the invention, a storing medium in which program codes (computer programs) of software adapted to realize the functions of the foregoing embodiments have been recorded may be used. In this case, the storing medium is supplied to the system or apparatus and a computer (or a CPU or an MPU) of the system or apparatus reads out and executes the program codes stored in the storing medium, so that the object of the invention is accomplished by a method.

In this case, the program codes themselves read out of the storing medium realize the functions of the embodiments mentioned above. The program codes themselves and the storing medium in which the program codes have been stored construct the invention.

As a storing medium for supplying the program codes, for example, a flexible disk, a hard disk, an optical disk, a magnetooptic disk, a CD-ROM, a CD-R, a magnetic tape, a non-volatile memory card, a ROM, or the like can be used.

Naturally, a case where the OS (basic system or operating system) or the like which is operating on the computer executes a part or all of actual processes based on instructions of the program codes is also incorporated.

Further, the program codes read out of the storing medium may be written into a memory provided for a function expanding board inserted in the computer or a function expanding unit connected to the computer. In such a case, a CPU or the like provided for the function expanding board or the function expanding unit may execute a part or all of the actual processes based on the instructions of the written program codes.

Although the invention has been described above with respect to the several exemplary embodiments, the invention is not limited to those embodiments but, naturally, many various modifications and applications within the scope of claims of the invention are possible.

This application claims the benefit of Japanese Patent Application No. 2008-092223, filed Mar. 31, 2008, which is hereby incorporated by reference in its entirety.

The invention claimed is:

1. An information processing apparatus using a plurality of file systems, comprising:
    a storage device managed by a first file system;
    a file forming unit configured to form one or a plurality of reservation files including a plurality of data blocks for assuring an area for a second file system in the storage device;

an area construction information forming unit for the second file system configured to form construction information of the area for the second file system;

a virtual logical block forming unit configured to form a virtual logical block address used by the second file system in order to designate data managed by the first file system in the storage device;

a logical block address converting unit configured to convert the virtual logical block address formed by the virtual logical block forming unit into a logical block address in the first file system based on the construction information formed by the area construction information forming unit for the second file system; and a data accessing unit configured to access the plurality of data blocks included in the one or a plurality of reservation files based on the logical block address converted by the logical block address converting unit.

2. An information processing apparatus according to claim 1, wherein the first file system is a general-purpose file system and the second file system is a file system peculiar to the information processing apparatus.

3. An information processing apparatus according to claim 1, wherein a reservation file has a size of a fixed length.

4. An information processing apparatus according to claim 1, wherein the file forming unit can increase or decrease the number of the one or a plurality of reservation files.

5. An information processing apparatus according to claim 1, wherein the file forming unit divides the area for the second file system into a plurality of areas and assures them.

6. An information processing apparatus according to claim 1, wherein the file forming unit assures areas of the one or a plurality of reservation files in the storage device so as to become a continuous area.

7. An information processing apparatus according to claim 1, wherein the data managed by the first file system is image data.

8. An information managing method carried out in an information processing apparatus using a plurality of file systems, comprising:

a file forming step of forming one or a plurality of reservation files including a plurality of data blocks for assuring an area for a second file system in a storage device managed by a first file system;

an area construction information forming step for the second file system of forming construction information of the area for the second file system;

a virtual logical block forming step of forming a virtual logical block address used by the second file system in order to designate data managed by the first file system in the storage device;

a logical block address converting step of converting the virtual logical block address formed in the virtual logical block forming step into a logical block address in the first file system based on the construction information formed in the area construction information forming step for the second file system; and a data accessing step of accessing the plurality of data blocks included in the one or a plurality of reservation files based on the logical block address converted in the logical block address converting step.

9. A non-transitory computer-readable storing medium storing computer executable code of a program for allowing a computer to execute an information managing method carried out in an information processing apparatus using a plurality of file systems, the method comprising:

a file forming step of forming one or a plurality of reservation files including a plurality of data blocks for assuring an area for a second file system in a storage device managed by a first file system;

an area construction information forming step for the second file system of forming construction information of the area for the second file system;

a virtual logical block forming step of forming a virtual logical block address used by the second file system in order to designate data managed by the first file system in the storage device;

a logical block address converting step of converting the virtual logical block address formed in the virtual logical block forming step into a logical block address in the first file system based on the construction information formed in the area construction information forming step for the second file system; and a data accessing step of accessing the plurality of data blocks included in the one or a plurality of reservation files based on the logical block address converted in the logical block address converting step.

* * * * *